Dec. 17, 1968  E. B. NOLT  3,416,825
TWINE FINGER AND ACTUATING MEANS FOR BALER
Filed Aug. 16, 1967  3 Sheets-Sheet 1

INVENTOR.
EDWIN B. NOLT
BY

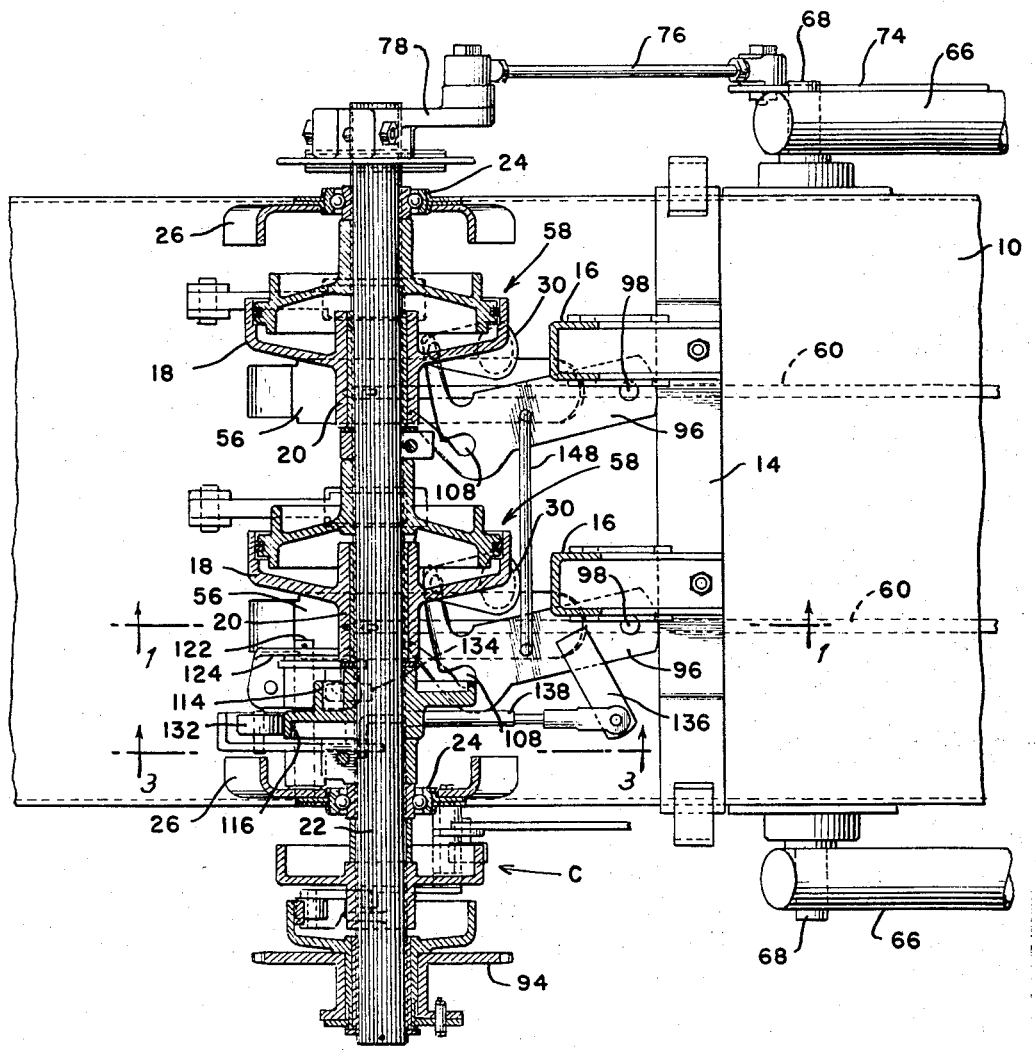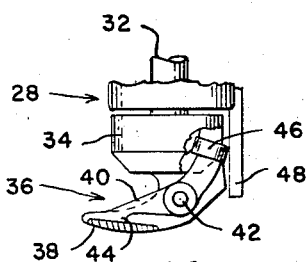

INVENTOR.
EDWIN B. NOLT

United States Patent Office 3,416,825
Patented Dec. 17, 1968

3,416,825
TWINE FINGER AND ACTUATING MEANS
FOR BALER
Edwin B. Nolt, New Holland, Pa., assignor to Sperry
Rand Corporation, New Holland, Pa., a corporation of
Delaware
Filed Aug. 16, 1967, Ser. No. 661,014
12 Claims. (Cl. 289—13)

ABSTRACT OF THE DISCLOSURE

A knotter mechanism assembly for a baler of the type employing loops of twine to tie bales in finished condition and including a knotter unit operatively associated with a clamping unit, means to operate said units to effect the tying of a knot in opposite ends of said loop of twine around a bale and including a twine needle movable relative to said case to carry the trailing end of said loop of twine around the trailing end of a bale being formed to interengage said knotter unit therewith, in combination with a twine finger supported pivotally adjacent said knotter unit and having a notch therein terminating in an eye operable to receive the opposite ends of said loop of twine and momentarily hold the same while the knotter unit ties a securing knot therein, said twine finger being movable in opposite directions respectively to insure engagement of the trailing end of said loop of twine with said knotter unit and subsequently to positively pull the completed knot from the bill hook of said knotter unit, and cam means operatively interconnected to said twine finger and including means positively to move said twine finger in both of said opposite directions of movement thereof.

Background of the invention

Balers for hay, straw and the like which employ a longitudinally extending case within which the bales are formed and embodying the use of twine for securing a plurality of loops thereof around finished bales are provided with a knotter mechanism assembly for each loop of twine for purposes of tying the opposite ends of each loop into securing knots. The knotter mechanism assemblies each include a knotter unit and a clamping unit, the latter effectively holding the leading end of a loop of twine while a bale is being formed and said loop is progressively extended around the leading end of said bale, as formed, followed by movement of the trailing end of said loop of twine upwardly around the trailing end of the bale by means of an arcuate twine needle which carries said trailing end of the twine, to which the supply is still connected, into engagement with the knotter unit.

The arcuate needles employed for the aforementioned purpose are relatively long and are supported at one end on a needle yoke which is operable at the required time in the cycle of operation of the baler to carry said trailing end of said loop of twine upward due to said twine being threaded through an eye in the outer end of said needle. The needles are long enough to traverse the bale case. For further appreciation of the type of knotter mechanism to which the present invention pertains, attention is directed to Patent No. 512,762, to Stewart, and Patent No. 615,815 to Dennis.

Summary of the invention

The principal purpose of the present invention is to provide auxiliary elements associated with the knotter and clamping units of the knotter mechanism assembly, said elements comprising twine fingers which are movably mounted relative to the top of the case of a baler adjacent an opening provided in said top for the passage of the outer end of a twine needle therethrough in order to carry the trailing end of a loop of twine into engagement with the knotter unit. During the cycle of operation of said knotter and clamping units, together with the function of the twine needle, actuating mechanism also is included to move each twine finger from an inoperative position toward the knotter unit and carry with it said trailing end of the loop of twine to be tied to the clamped leading end thereof, thereby to insure engagement of the knotter unit with said trailing end of said loop of twine, to which the supply of twine is still connected. Further, each twine finger has a notch in the outer end thereof terminating in an eye within which both ends of said loop of twine are disposed and are accurately held relative to the knotter unit while the same is operating to form a tight knot therein, said actuating mechanism for the twine finger subsequently and rapidly functioning to positively move the twine finger in the opposite direction and thereby insure pulling of the completed knot from the bill hook of the knotter unit so as to free the mechanism for ready engagement with the twine strands to be tied around the next successive bale to be formed within the bale case.

It is a further object of the invention to provide cam means associated with the actuating mechanism for the twine fingers, said cam means preferably comprising a plurality of cam surfaces respectively actuating cam followers comprising part of the actuating mechanism and operable respectively to positively move the notched end of said twine fingers toward the knotter unit to insure engagement thereof with the twine to form a knot and subsequently to positively move said actuating mechanism in the opposite direction to insure certain and definite movement of each twine finger in the opposite direction to that first mentioned for purposes of assuring the removal of a completed knot from the bill hook of each knotter unit.

It is a further object of the invention to include in said actuating mechanism connecting rod means extending between the plurality of twine fingers which preferably are supported by the bale case in correspondingly spaced relationship to the plurality of knotter mechanism assemblies supported thereby in order that a plurality of loops of twine may be formed around a single bale simultaneously, the actuating mechanism for the twine fingers being connected to only a single twine finger whereas the connecting rod means transmits such movement of the one finger to the other finger.

Brief description of the drawings

FIG. 2 is a fragmentary plan view, partly in horizontal section, of the knotter mechanism assembly shown in FIG. 1, as seen on the lines 2—2 of said figure;

FIG. 5 is a fragmentary view, partly in vertical section, showing details of the bill hook assembly of the knotter unit shown in FIG. 1 in phantom.

Description of the preferred embodiments

Figure 1:
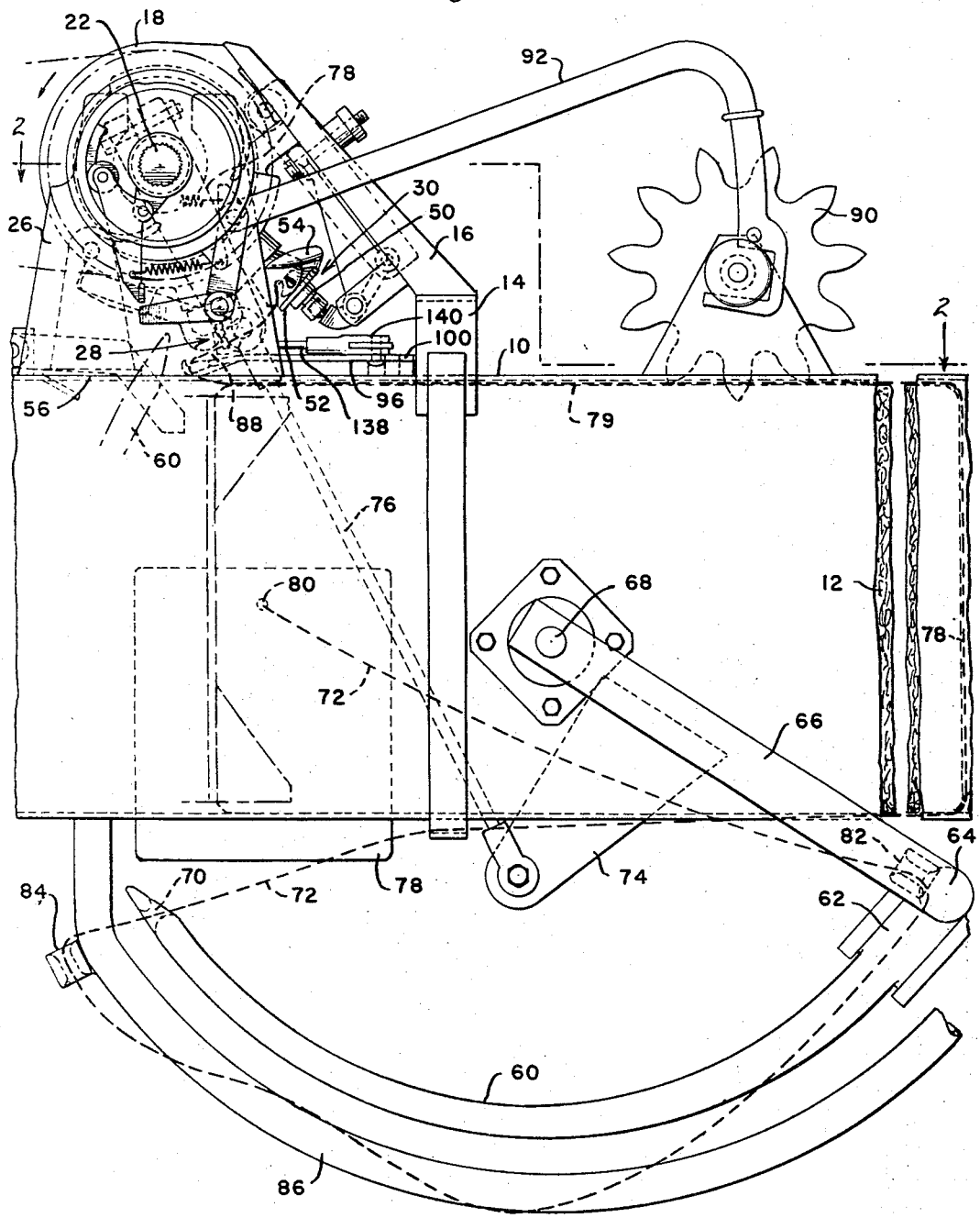
FIG. 1 is a fragmentary vertical sectional view, as seen on the lines 1—1 of FIG. 2 looking in the direction of the arrows, showing a fragmentary portion of a case of a baler within which a bale is formed and showing in association therewith a knotter mechanism assembly mounted on top of the base and a twine needle and its supporting means being shown beneath the case, the knotter mechanism assembly embodying twine finger means comprising the present invention.

Referring to FIG. 1, a longitudinal section of a generally horizontal case 10 is shown, the same preferably being generally rectangular in cross section for purposes of forming the customary shape of a bale 12 which is partially shown in the broken portion of the case adjacent the right hand end thereof in said figure to foreshorten the view. It will be understood that said case preferably is of a mobile type supported by wheels, not shown but of a conventional nature in balers. The baler may be either self-propelled or be pulled by a tractor which, preferably, is provided with a power take off and suitable power transfer means are connected therefrom to certain drive means of the baler which are described in detail hereinafter.

Mounted preferably on the top of the case 10 is a transversely extending bracket 14 connected fixedly to the case for purposes of supporting a plurality of transversely spaced rigid arms 16. Each of said arms, adjacent the upper end thereof, is connected to a frame casting 18, each of which, as best shown in FIG. 2, comprise a shell-like housing, the same having axially aligned bearings 20 through which a longitudinally splined drive shaft 22 extends. The opposite ends of the drive shaft are supported by bearings 24 mounted in upright standards 26 connected to the top of the case 10 respectively adjacent opposite sides thereof, as best shown in FIG. 2.

Extending radially from the lower portion of each of the frame castings 18 are a knotter unit 28 and a clamping unit 30, as seen in FIG. 1. The knotter unit 28 is shown only in phantom in FIG. 1 but, in FIG. 5, a fragmentary portion of the lower end thereof is illustrated to show that the same comprises a rotatable shaft 32 to the lower end of which a cup-like shell 34 is fixed which comprises part of a bill hook structure 36. Said bill hook structure comprises a jaw 38 which is fixed to shaft 32 and is slotted between the sides thereof to receive a bill hook tongue 40 which is pivotally connected by a pin 42 within said slot in the fixed jaw 38. The outer end of tongue 40 terminates in a downwardly extending, short hook-like projection 44. The opposite end has an actuating roller 46 thereon which is somewhat in the nature of a cam follower that cooperates with cam means, part of which comprises downwardly extending member 48.

The shaft 32 extends radially downward relative to the axis of the drive shaft 22 and is perpendicular thereto for actuation thereby through gear means, not shown in detail, but illustrated in other applications of the present series thereof referred to above. Clamping unit 30 also comprises an operating shaft 50 which is connected to the outermost clamping member 52 of said unit and through which an arcuate, pointed twine guide hook 54 is integrally connected for rotation by said shaft. Said shaft, like shaft 32 of the knotter unit, is actuated by drive shaft 22 through the medium of gears not illustrated herein but shown in other applications of the present series thereof.

In the formation of a knot to secure the opposite ends of a loop of twine around a bale 12, when the size has reached a desired length, the drive shaft 22 is rotated a single revolution by a conventional one-revolution clutch and in a very short period of time comprising less than a second. During said revolution, the knotter and clamping units 28 and 30 are actuated through their complete cycle to tie a knot, further details of which are set forth hereinafter.

The top of bale case 10 is provided with an opening 56 for each of the knotter mechanism assemblies 58 mounted on top of case 10. The openings 56 are elongated and actually comprise slots which are disposed beneath and spaced a short distance laterally from the frame casting 18 of each of the knotter mechanism assemblies 58. The openings 56 are also adjacent the knotter and clamping units as will be seen by reference to FIG. 2 wherein the clamping units 30 are illustrated, and it will be understood that the knotter units are directly beneath.

Each of the knotter mechanism assemblies 58 have an arcuate twine needle 60 cooperable therewith, the same being shown in the lower part of FIG. 1 and it will be understood that said plurality of such needles are spaced transversely with respect to case 10 similarly to the spacing of the assemblies 58 which are mounted on top of case 10. The base end 62 of each needle 60 is detachably and adjustably connectable to a bar or rod 64 of a needle yoke. Bar 64 extends transversely between the outer ends of a pair of supporting and actuating arms 66 of the yoke, the opposite ends of said arms being pivotally supported by pintles 68 extending outwardly from opposite sides of case 10.

The outer free ends of needles 60 are provided with eyes 70 through which a strand of twine 72 extends. During the tying cycle of the knotter and clamping units 28 and 30, the needles 60 are moved around the axis of pivots 68 in a clockwise direction to project the ends of the needles having the eyes 70 therein upwardly, across the bale case, and somewhat past the position of the knotter and clamping units 28 and 30, a portion of said movement being indicated in phantom in fragmentary manner in FIG. 1 wherein it will be seen that the tip of a needle 60 is in an intermediate position partly extending through opening 56. It will be understood that each needle 60 projects through an individual opening 56, as also can be seen from FIG. 2, wherein the needles are shown in phantom and the tip ends thereof are aligned with the openings 56.

Projection of the needles 60 as aforesaid is accomplished by means of an actuating arm 74 which is connected at one end to and extends laterally from one of the arms 66. The outer end of arm 74 is connected pivotally to one end of a connecting link 76 and the opposite end thereof is pivotally connected to the outer end of a crank arm 78 which is otherwise secured to one end of drive shaft 22, as clearly shown in FIG. 2.

A supply of twine arranged in a ball is mounted within a container 78 shown in FIG. 1. It will be seen that the twine strand 72 leads from a feed opening 80 in the container 78 and extends from there through a guide 82 carried by bar 64, for example. It will be understood that one such strand of twine 72 is provided for each of the knotter mechanism assemblies 58. The twine extends from guide 82 to another guide 84 which, for example, is mounted upon an arcuate guard 86, the opposite ends of which are fixed to the bottom of case 10 within the plane of the needle 60 which it is guarding. One such guard is provided for each needle and the guards are sapced a reasonable distance below the needles so as to protect the same against injury as when the baler contacts hillocks or other obstructions when moving over a field or the like.

From guide 84, the twine 78 extends toward the right, as shown by the dotted lines in FIG. 1, up around the front end of the bale 12 and along the top of the bale as it is formed, the terminal end 88 of the strand of twine being clamped by the clamping unit 30. It will be understood that as the bale 12 is formed and progressively is moved to the right, as viewed in FIG. 1, the strand of twine 72 will be pulled from the container 78, through the guides 82 and 84, said strand also extending through the eye 70 in the outer end of the twine needle 60, as shown in FIG. 1.

When the bale 12 has reached a desired length as determined by the rotation of a metering wheel 90 projecting into bale case 10 and the bales formed therein clutching mechanism C actuated by arm 92 and other mechanism connected thereto, but not described in detail because of the conventional nature thereof, operates and rotates the drive shaft 22 by power means connected to sprocket gear 94 which is fixed to one end of said drive shaft. Such movement projects the needles 60 and carries the outer ends thereof, through which the strands of twice 72 extend, around the trailing end of each bale 12 and into the region of the knotter and clamping units 28 and 30.

To insure that the trailing end of the loop of twine which is to extend up around the trailing end of the bale will be brought by the needle 60 into positive engagement especially with the bill hook structure 36 of the knotter unit 28, one of the principal purposes of the present invention is to provide for each of the knotter mechanism assemblies 58 a twine finger 96. In the preferred construction thereof, the twine fingers 96, which are best shown in plan view in FIGS. 2 and 4, may be formed by stamping or forging the same from sheet metal. One end of each finger 96 is provided with an aperture which receives pivot bolt 98 which projects upward from bracket 100. The opposite end of each twine finger 96 is provided with a slot 102, the opposite sides of which are defined by a pair of ears 104 and 106 which in plan view are disposed at an angle to each other to form a tapered entrance to the eye 108 at the inner end of slot 102. As seen from FIG. 4, a portion 105 of the inner end of ear 104 partially overlaps the mid portion of ear 106 but is vertically spaced above the same as is clear from FIG. 3 wherein the twine finger 96 is shown in edge view. Portion 105 provides a control for the movement of twine through slot 102, both inwardly and outwardly.

The function of the twine fingers 96 is to engage the opposite ends of the strand of twine which is extended around the compressed bale 12 by operation of needle 60 after the trailing end of said loop has been engaged by the knotter unit 28 and while the leading end of said loop which has been held clamped by clamping unit 30 is still clamped thereby. Such engagement of the opposite ends of said loop of twine is effected by pivotal movement of the outer end of each twine finger 96, clockwise as viewed in FIGS. 2 and 4, which will cause said opposite end to be received within the slot 102 and the flaring entrance formed by the outer ends of ears 104 and 106 facilitates this, as can be visualized from FIGS. 2 and 4. Actually, the ear 106 is somewhat hook-shaped.

Such pivotal movement of the twine fingers 96 is sufficient in said clockwise direction to insure that the ends of the twine engaged within the eye 108 will be held in suitable position to be engaged by the bill hook structure 36 of knotter unit 28. At the completion of the knotting operation by which said ends of such loop of twine are tied together, the twine finger 96 also is arranged to insure positive removal of the completed knot from the bill hook structure 36 and especially to prevent any accidental retaining of such knot or any portion thereof such as by engagement thereof with the short hook-like projection 44 on the bill hook tongue 40, as seen in FIG. 5.

Such positive removal of the completed knot from the bill hook structure is assured by reason of the base end of ear 104 having an edge portion 110 comprising part of the periphery of the eye 108, which extends transversely to the path of movement of said outer end of the twine finger 96 and substantially longitudinally of the axis thereof. The edge portion 110 is also substantially parallel to the longitudinal axis of the slot-like opening 56 in the vicinity of which the eye 108 is located at the time such retracting movement of the twine finger 96 occurs, in counterclockwise direction as viewed in FIGS. 2 and 4. Ejecting movement of the completed bale within case 10 toward the right, as viewed in FIGS. 2–4, serves to remove the completed knots from engagement within the eyes 108 of twine fingers 96 in view of the eye 108 in each such finger being of adequate size to freely permit the completed knot to pass therethrough in a somewhat axial direction. Accordingly, the completed knot does have to pass through the narrow slot 102 between fingers 104 and 106.

Actuating movement of the twine fingers 96 is accomplished by mechanism which comprises an important part of the present invention. Such mechanism is shown in enlarged manner in FIGS. 3 and 4 but also can be seen in FIG. 2 as well. Such mechanism includes a pair of rotatable cams 112 and 114. In the specific illustration in FIGS. 3 and 4, the cams comprise a unitary casting having a hub 116 through which the drive shaft 22 extends and to which said compound cam is connected such as by a clamping bolt 118.

Figure 3:
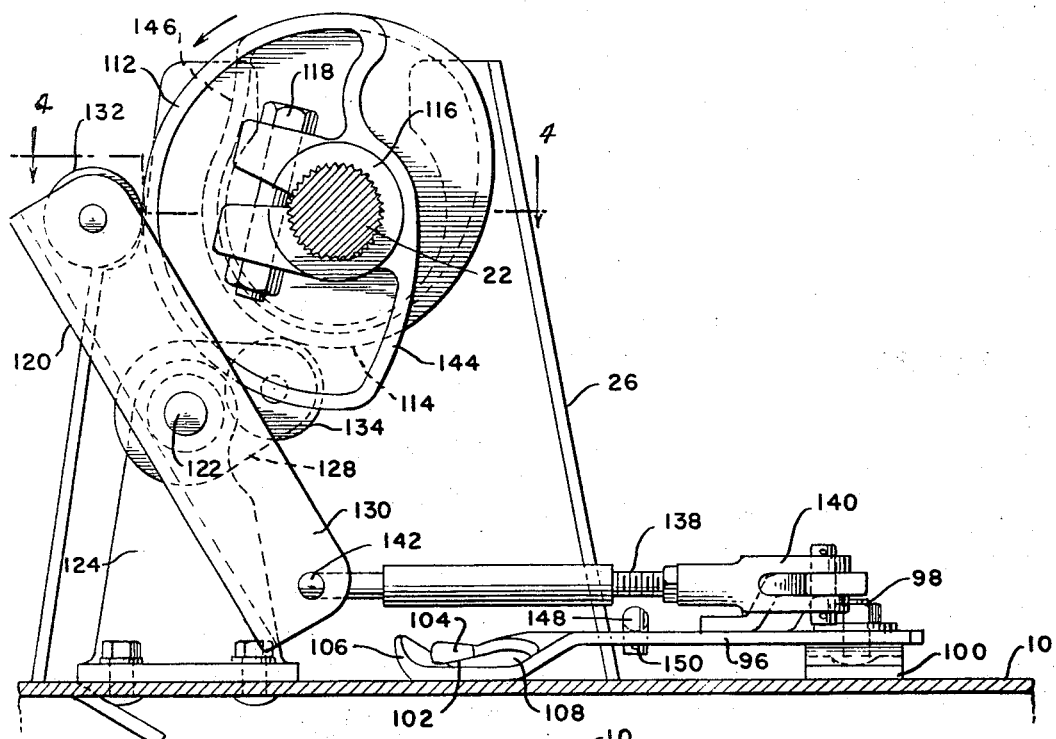
FIG. 3 is a fragmentary vertical sectional elevation of a portion of the knotter mechanism assembly shown in FIGS. 1 and 2, as seen on the lines 3—3 of FIG. 2, and especially showing the cam means for actuating the twine fingers of the invention.
Figure 4:
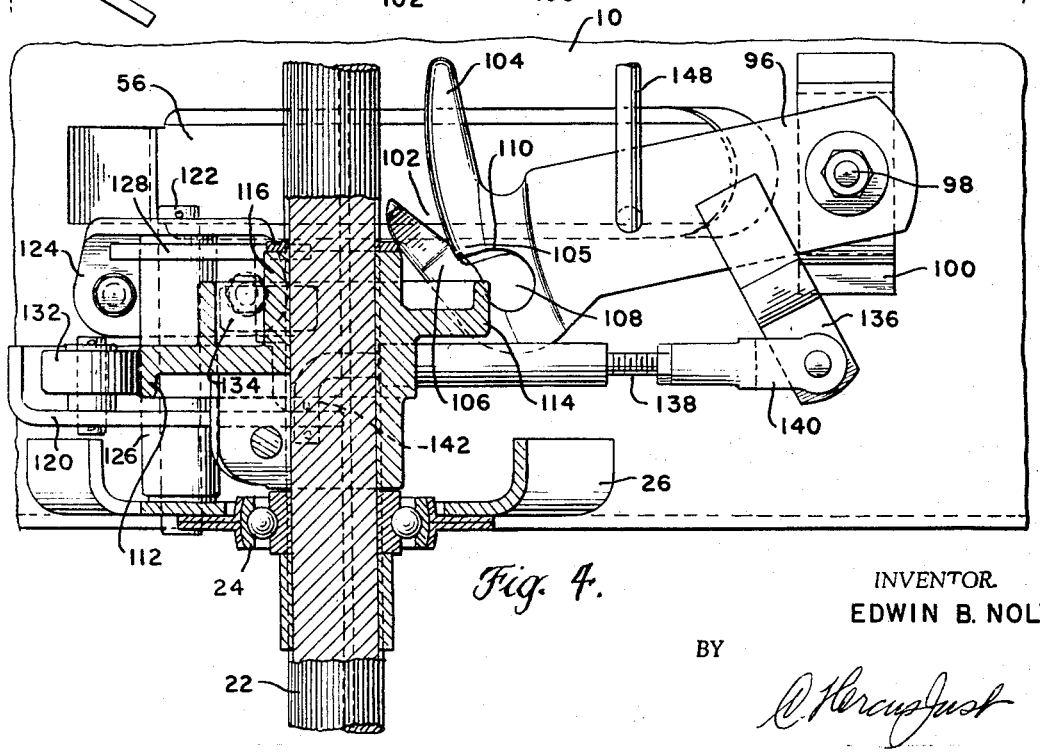
FIG. 4 is a fragmentary horizontal sectional view of the mechanism shown in FIG. 3 as seen on the lines 4—4 of said figure.

It will be seen from FIG. 4 that the cams 112 and 114 are disposed within parallel but axially spaced planes transverse to the axis of drive shaft 22. The drive shaft 22 rotates the compound cam counterclockwise, as indicated by the arrow in FIG. 3. By such arrangement, the cam 114 moves the twine fingers 96, clockwise as viewed in FIG. 4, to operative position and the cam 112, at the completion of the knotting movement, restores the twine fingers 96 to the inoperative position thereof illustrated in FIGS. 2 and 4. Such movement is accomplished by the following means.

A lever 120 (FIG. 3) is pivoted intermediately of its end upon a shaft 122. One end of the shaft is supported within a bearing hole in the upper end of a short vertical bracket 124, while the other end of said shaft is supported in a similar bearing hole formed in the standard 26 shown in FIG. 4 adjacent one side of case 10. The lever 120 is integral with an elongated hub 126 and, axially spaced upon said hub from lever 120 is another short lever 128. The lever 128, in conjunction with the upper portion of lever 120, as viewed in FIG. 3, comprises a bell crank, while the lower end 130 of lever 120 comprises an extension from said lever.

The upper end of lever 120 rotatably supports a cam follower roller 132 and the outer end of short lever 128 supports another rotatable cam follower roller 134. The cam follower 132 engages the outer periphery of cam 112, while the cam follower 134 engages the periphery of the cam 114. The shapes of said cams and the lengths of the arms of the bell crank arrangement which respectively support the cam followers 132 and 134 are such that, as the compound cam 112, 114 is rotated, the followers 132 and 134 will respectively be substantially in constant rolling contact therewith so as to afford accurate actuation of the extension 130 comprising the lower end of ear 120 for the following purposes.

One of the twine fingers 96 is provided intermediately of the ends thereof with a lateral extension 136 that is rigid. A preferably longitudinally adjustable link 138 has a clevis 140 on one end thereof which is connected by a pin to the outer end of extension 136, while the opposite end of link 138 terminates in a right angled pivot 142, as shown in phantom in FIG. 4, which is received within an appropriate bearing hole in the lower end 130 of lever 120. Accordingly, particularly since the pivotal movement of the lever 120 is not of a great extent, the movement of link 138 will be substantially within a horizontal plane parallel to the top of case 10.

Movement of the link 138 longitudinally in opposite directions as effected by the engagement of the cam followers 132 and 134 with their respective cams 112 and 114 and, particularly in view of the abrupt rise 144 in cam 112 and the correspondingly abrupt rise 146 in cam 114, will cause rapid movement of the outer end of the twine fingers 96 in both operative direction toward the knotter and clamping units, and also in retracting direction to the rest or inoperative position thereof which is shown in FIGS. 2 and 4. Such movement in both directions is positive due to the direct actuation of the twine fingers as aforesaid by simple linkage and lever means which are activated by accurate and positively driven cams which are engaged by cam followers on such lever means.

To require only a single compound cam assembly to actuate a plurality of twine fingers 96 as shown in FIG. 2, it will be seen that only one of the twine fingers has the extension 136 connected thereto for actuation by the link 138 and the compound cam and cam follower mechanism. A connecting rod 148, preferably of a simple nature and having only the opposite ends bent at right angles thereto, extends between appropriate bearing holes respectively formed in each of the twine fingers 96, at corresponding locations therein, intermediately of the ends thereof. A cotter pin 150, shown in FIG. 3, is used to retain each of the terminal ends of connecting rod 148 in the holes therefor within the twine fingers 96. By such mechanism, the movement of the twine finger which is positively driven by link 138 will be accurately and immediately transmitted to the other twine finger.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A knotter mechanism assembly for a baler comprising a knotter unit including a bill hook, a clamping unit to hold the terminal end of a strand of twine clamped during the tying cycle of the knotter unit, means to support and operate said units upon a bale case having an opening in the top thereof, a twine needle supported upon said case for movement of the tip end thereof through said opening in said top thereof to project a loop of twine threaded through an eye in said tip end around a bale and position the trailing end of said loop of twine into engagement with said knotter and clamping units, and means to move said needle as aforesaid when a predetermined amount of material has been compressed in said bale case to form a bale, in combination with a twine finger supported pivotally by a pivot fixed relative to the top of said case adjacent said opening therein and said knotter and clamping units, one end of said twine finger having a notch extending laterally thereinto from one side thereof and terminating inwardly in an eye, to receive strands of twine to be tied into a knot by said knotter unit, actuating means connected to said twine finger and operable in opposite directions respectively to move said one end of said finger laterally relative to the axis of said case toward and from said opening respectively to insure holding strands of twine in operative engagement by said knotter unit and remove the same therefrom, and cam means operable to move said actuating means.

2. The knotter mechanism according to claim 1 in which said cam means moves said finger in one direction and a spring moves the finger in an opposite direction.

3. The knotter mechanism according to claim 1 in which said cam means is positive in both of said directions.

4. The knotter mechanism assembly according to claim 1 in which said twine finger further includes ears extending outward from the outer end of said notch in said twine finger in a generally transverse direction to the longitudinal axis of the finger and said ears extending at an angle to each other to define opposite sides of a flaring entrance to said eye at the inner end of said notch, and one of said ears having a portion extending over the other of said ears.

5. The knotter mechanism assembly according to claim 1 in which said eye has one peripheral wall portion extending substantially in a parallel direction to the longitudinal axis of said finger and transversely to the direction of movement of the outer end of said finger which contains said notch, said wall portion being operable to engage a knot when formed by said knotter unit and positively pull the same from the bill hook of said knotter unit to insure separation of said knot from the knotter unit.

6. The knotter mechanism assembly according to claim 1 in which said cam means comprises a rotatable cam member upon which the periphery comprises the cam surface and said mechanism also including a cam follower interconnected to said twine finger and engageable with said cam surface of said rotatable cam.

7. A knotter mechanism assembly according to claim 6 further including a link extending between said cam follower and twine finger and operable to transmit movement initiated by the contour of said cam to said twine finger.

8. A knotter mechanism assembly according to claim 7 further including a lever pivotally supported relative to said case and carrying said cam follower thereon for engagement with said rotatable cam, and said lever also including means to connect one end of said link to said lever for actuation of said link by said lever.

9. The knotter mechanism assembly according to claim 6 in which said cam means comprises a plurality of cams and a corresponding plurality of cam followers also are interconnected to said twine finger, said cam followers respectively engaging said cams, one of said cams being operable to move said twine finger positively in one direction and the other cam being operable to move the same positively in the opposite direction.

10. The knotter mechanism assembly according to claim 9 further including a rotatable shaft extending transversely to the axis of said bale case and supported thereby, said cams being carried by said shaft and connected thereto for rotation by said shaft, said twine finger being substantially parallel to the axis of said bale case and having a lateral extension thereon, and said mechanism also including a link interconnected between the outer end of said lateral extension and said cam followers to transmit to said twine finger movement of said followers as induced by said cams.

11. The knotter mechanism assembly according to claim 10 further including lever means comprising a bell crank, means thereon supporting said cam followers respectively for engagement with said cams, means pivotally supporting said lever intermediately of the ends thereof, and one end of said lever projecting beyond said pivot for connection to one end of said link.

12. The knotter mechanism assembly according to claim 6 further including a plurality of twine fingers pivotally connected relative to said bale case in transversely spaced relationship and a plurality of knotter mechanism assemblies also being supported by said bale case in corresponding transversely spaced relationship relative to said twine fingers and said bale case also having a similar number of correspondingly transversely spaced openings therein for projection of a corresponding number of twine needles respectively therethrough, said cam follower being interconected to only a single cam finger and said assembly further including a connecting rod extending transversely between said plurality of twine fingers intermediately of the ends thereof and operable to transmit the motion of said one twine finger to the other twine finger.

References Cited

UNITED STATES PATENTS

| | | | |
|---|---|---|---|
| 615,815 | 12/1898 | Dennis | 289—13 |
| 1,155,860 | 10/1915 | Witte | 289—13 |
| 3,101,963 | 8/1963 | Sullivan et al. | 289—2 X |
| 3,243,214 | 3/1966 | Keates | 289—2 |

LOUIS K. RIMRODT, *Primary Examiner.*